United States Patent
Iura et al.

(10) Patent No.: US 7,463,005 B2
(45) Date of Patent: Dec. 9, 2008

(54) METHOD AND DEVICE FOR SENSORLESS VECTOR CONTROL FOR AC MOTOR

(75) Inventors: Hideaki Iura, Fukuoka (JP); Yoichi Yamamoto, Fukuoka (JP); Shigekazu Nakamura, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 248 days.

(21) Appl. No.: 10/548,671

(22) PCT Filed: Mar. 8, 2004

(86) PCT No.: PCT/JP2004/002988

§ 371 (c)(1),
(2), (4) Date: Jul. 31, 2006

(87) PCT Pub. No.: WO2004/082120

PCT Pub. Date: Sep. 23, 2004

(65) Prior Publication Data

US 2007/0018606 A1    Jan. 25, 2007

(30) Foreign Application Priority Data

Mar. 12, 2003   (JP)   ............................. 2003-067279

(51) Int. Cl.
  *H02P 1/24* (2006.01)

(52) U.S. Cl. .................................. 318/727; 318/400.02
(58) Field of Classification Search ................. 318/727, 318/432, 599, 811, 400.02, 434
See application file for complete search history.

(56) References Cited

U.S. PATENT DOCUMENTS

| | | | | |
|---|---|---|---|---|
| 4,862,054 | A * | 8/1989 | Schauder | 318/800 |
| 5,959,430 | A * | 9/1999 | Yuki et al. | 318/805 |
| 6,184,638 | B1 | 2/2001 | Kinpara | |
| 6,335,605 | B1 * | 1/2002 | Negoro | 318/727 |
| 6,498,451 | B1 * | 12/2002 | Boules et al. | 318/661 |

FOREIGN PATENT DOCUMENTS

| | | |
|---|---|---|
| JP | 8-70599 A | 3/1996 |
| JP | 8-205599 A | 8/1996 |
| JP | 8-322300 A | 12/1996 |
| JP | 11-308900 A | 11/1999 |
| JP | 2002-136196 A | 5/2002 |
| JP | 2003-18898 A | 1/2003 |

\* cited by examiner

*Primary Examiner*—Rina I Duda
(74) *Attorney, Agent, or Firm*—Sughrue Mion, PLLC (57) ABSTRACT

A control method and a controller for an a.c. motor without using a speed sensor in which the speed estimated value or the magnetic flux estimated value of an all-dimensional magnetic flux speed observer can be made to correspond to that of an actual a.c. motor.

10 Claims, 6 Drawing Sheets

METHOD AND DEVICE FOR SENSORLESS VECTOR CONTROL FOR AC MOTOR

TECHNICAL FIELD

The present invention relates to a vector control method and a vector controller for an a.c. motor, particularly, an induction motor without using a speed sensor.

RELATED ART

As a usual speed estimating method for an induction motor and a driving device for an induction motor, for instance, JP-A-Hei08-205599 (Patent Document 1) proposes that a speed estimated value is corrected by the absolute value of a secondary inter-linkage magnetic flux obtained from the estimated value of the secondary inter-linkage magnetic flux to reduce the error of the speed estimated value in an all-dimensional magnetic flux speed observer.

Further, JP-A-2002-136196 (Patent Document 2) proposes that, to suppress a shock due to a phenomenon that an excessively large quantity of torque current flows until a secondary magnetic flux rises, a timer, a limiter setting calculating unit and a torque limiter are inserted into a path from a command value generating unit for generating a torque command value to a voltage command value calculating circuit, a time elapsing after a start signal from a start signal generating circuit is validated is measured by the timer, a torque limiter value is calculated by the limiter setting value calculating unit on the basis of the measured value and a value obtained by limiting the torque command value to a value not higher than the torque limiter value is set as a new torque command value to carry out a smooth start.

Further, JP-A-Hei08-70599 (Patent Document 3) proposes a method in which when a speed estimated value is higher than a maximum speed, a current command value of a primary torque shaft is set to zero by an excessive rotation preventing device so as not to generate torque in an accelerating direction and not to excessively rotate an induction motor in a vector controller for the induction motor having no speed sensor in which an actual speed value of the induction motor is estimated by the same dimensional observer and a speed adaptive secondary magnetic flux observer including a speed adaptive mechanism, and a current control part is controlled by a compared error signal of the motor speed estimated value and a motor speed command value to control a vector.

Elements of matrixes A, B and G (described below) of the all-dimensional magnetic flux speed observer proposed in the above-described Patent Document 1 are respectively calculated as fixed values that do not change at other speed than ordinary speed. However, when the induction motor has such a property as to be easily magnetically saturated, mutual inductance changes in accordance with the level of a magnetic flux command. Accordingly, with the fixed values kept, the speed estimated value or the phase of an estimated magnetic flux is inaccurate so that an operation cannot be carried out so as to meet the command.

Further, in the all-dimensional magnetic flux speed observer proposed in the above-described Patent Document 1, the magnetic flux or the speed is estimated in a discrete value process. To simplify the calculation of the observer, an oiler primary approximation is employed. Further, assuming that the speed has a fixed value during a very little time (sampling time), a calculation is carried out upon calculating them. However, when the induction motor having a small capacity and a small inertia is suddenly accelerated under a state having no load, the speed changes during the very little time (sampling time). In this case, the speed estimated value in the all-dimensional magnetic flux speed observer is dissociated from the actual speed of the induction motor. Thus, an unstable control state arises, a large quantity of electric current flows or an operation is carried out under an excessively slipping state, so that the induction motor cannot be operated in a stable way. Particularly, when an accelerating time is short or the variation of speed is large, the above-described state is liable to arise. On the other hand, even when the accelerating time is short, if the variation of speed is small, the above-described state hardly arises.

Further, the method described in the Patent Document 2 serves to treat the induction motor having a large capacity in which the rise of the secondary magnetic flux is slow, so that the above-described problem in the induction motor having the small capacity and the small inertia cannot be solved. Ordinarily, the torque limit value upon starting may be suppressed as in the Patent Document 2. In such a way, even when the variation of speed is low, a torque limit undesirably operates.

Further, the method described in the Patent Document 3 serves to estimate and control the actual speed value of the induction motor by the speed adaptive secondary magnetic flux observer. However, this method is a method for preventing the excessive speed, so that the above-described problem in the induction motor having the small capacity and the small inertia cannot be solved.

DISCLOSURE OF THE INVENTION

It is an object of the present invention to provide a vector control method and a vector controller for an a.c. motor without using a speed sensor in which the speed estimated value or the magnetic flux estimated value of an all-dimensional magnetic flux speed observer can be made to correspond to that of an actual a.c. motor.

Further, it is a second object of the present invention to provide a vector control method and a vector controller for an a.c. motor without using a speed sensor in which when a speed deviation is large, a quick acceleration can be realized without an unstable control.

In order to achieve the first object, aspect of the invention provides a vector control method for an a.c. motor without using a sensor, the a.c. motor including: a power converter for outputting electric power to the a.c. motor; an exciting current command calculating unit for calculating an exciting current command from the magnetic saturation property of the a.c. motor to an arbitrary magnetic flux command; a torque current command calculating unit for calculating a torque current command from an arbitrary torque command and the magnetic flux command; a current detecting unit for detecting current supplied to the a.c. motor; a coordinate transformation unit for transforming the detected current to a stator coordinate system; a vector control and calculating unit for controlling and calculating a vector from the exciting current command, the torque current command, the coordinate transformed current detected value, a speed estimated value and a magnetic flux phase estimated value to output an output voltage command; a switching pattern generating unit for generating a signal for PWM driving the power converter from the output voltage command; and an all-dimensional magnetic flux speed observer for estimating the speed estimated value and the magnetic flux phase estimated value from the output voltage command and the coordinate transformed current detected value, wherein a coefficient of a determinant used in the all-dimensional magnetic flux speed observer is corrected in accordance with the magnetic flux command.

Specifically, since the speed estimated value or the magnetic flux estimated value of the all-dimensional magnetic flux speed observer can be made to correspond to the speed or the magnetic flux of an actual a.c. motor, speed can be accurately estimated even in the a.c. motor that is liable to be magnetically saturated.

In a specific enhancement the coefficient of the determinant is corrected on the basis of the change of the magnetic saturation property of the mutual inductance of the a.c motor.

Specifically a calculation is performed by considering a fact that when the coefficients of the determinant are respectively calculated, an enormous quantity of calculation is necessary on the basis of the magnetic saturation property of the mutual inductance of the a.c. motor. Thus, an approximate calculation can be realized and the speed can be accurately estimated.

In a specific enhancement, the coefficient of the determinant used in the all-dimensional magnetic flux speed observer is corrected in accordance with a magnetic flux level calculated from the exciting current command.

Specifically since the magnetic flux level is calculated by calculating a magnetic flux model from the exciting current command, even when the magnetic flux command is suddenly changed, an actual magnetic flux can be adequately followed.

Another aspect of the invention is a vector controller for an a.c. motor without using a sensor, including: a power converter for outputting electric power to the a.c. motor; an exciting current command calculating unit for calculating an exciting current command from the magnetic saturation property of the a. c. motor to an arbitrary magnetic flux command; a torque current command calculating unit for calculating a torque current command from an arbitrary torque command and the magnetic flux command; a current detecting unit for detecting current supplied to the a.c. motor; a coordinate transformation unit for transforming the detected current to a stator coordinate system; a vector control and calculating unit for controlling and calculating a vector from the exciting current command, the torque current command, the coordinate transformed current detected value, a speed estimated value and a magnetic flux phase estimated value to output an output voltage command; a switching pattern generating unit for generating a signal for PWM driving the power converter from the output voltage command; and an all-dimensional magnetic flux speed observer for estimating the speed estimated value and the magnetic flux phase estimated value from the output voltage command and the coordinate transformed current detected value, wherein a coefficient correcting unit is provided for correcting a coefficient of a determinant used in the all-dimensional magnetic flux speed observer in accordance with the magnetic flux command.

Specifically since the speed estimated value or the magnetic flux estimated value of the all-dimensional magnetic flux speed observer can be made to correspond to the speed or the magnetic flux of an actual a.c. motor, speed can be accurately estimated even in the a.c. motor that is liable to be magnetically saturated.

In a specific enhancement the coefficient correcting unit corrects the coefficient on the basis of the change of the magnetic saturation property of the mutual inductance of the a.c motor.

Specifically a calculation is performed by considering a fact that when the coefficients of the determinant are respectively calculated, an enormous quantity of calculation is necessary on the basis of the magnetic saturation property of the mutual inductance of the a.c. motor. Thus, an approximate calculation can be realized and the speed can be accurately estimated.

A specific enhancement further includes a magnetic flux model calculating unit for calculating a magnetic flux level from the exciting current command; and a coefficient correcting unit for correcting the coefficient of the determinant used in the all-dimensional magnetic flux speed observer in accordance with the magnetic flux level.

Specifically since the magnetic flux level is calculated by calculating a magnetic flux model from the exciting current command, even when the magnetic flux command is suddenly changed, an actual magnetic flux can be adequately followed.

Another aspect of the invention is a vector control method for an a.c. motor without using a sensor, the a.c. motor including: a power converter for outputting electric power to the a.c. motor; a current detecting unit for detecting current supplied to the a.c. motor; a coordinate transformation unit for transforming the detected current to a stator coordinate system; a speed control unit for outputting a torque current command so that an arbitrary speed command corresponds to the speed estimated value of the a.c.motor; a vector control and calculating unit for controlling and calculating a vector from an arbitrary exciting current command, the torque current command, the coordinate transformed current detected value, the speed estimated value and a magnetic flux phase estimated value to output an output voltage command; a switching pattern generating unit for generating a signal for PWM driving the power converter from the output voltage command; and a speed estimating unit for estimating the speed estimated value and the magnetic flux phase estimated value from the output voltage command and the coordinate transformed current detected value, wherein when a speed deviation as a deviation between the arbitrary speed command as an input of the speed control unit and the speed estimated value is inputted to the speed control unit, the speed deviation is limited not to generate an acceleration not lower than the ability of the speed estimating unit and inputted to the speed control unit.

Specifically, the speed deviation value inputted to the speed control unit is limited from a time during which the a.c. motor can be accelerated in the shortest time and a time during which the speed estimating unit can be accelerated in the shortest time. Accordingly, even when the a.c. motor is abruptly accelerated or decelerated, the speed can be controlled in a stable way.

In a specific enhancement, the speed estimating unit is an all-dimensional magnetic flux speed observer including an all-dimensional observer and a speed estimator.

Specifically the speed is estimated by the all-dimensional magnetic flux speed observer so that the speed estimated value can be made to correspond to the arbitrary speed command.

Another aspect of the invention is a vector controller for an a.c. motor without using a sensor, including: a power converter for outputting electric power to the a.c. motor; a current detecting unit for detecting current supplied to the a.c. motor; a coordinate transformation unit for transforming the detected current to a stator coordinate system; a speed control unit for outputting a torque current command so that an arbitrary speed command corresponds to the speed estimated value of the a.c.motor; a vector control and calculating unit for controlling and calculating a vector from an arbitrary exciting current command, the torque current command, the coordinate transformed current detected value, the speed estimated value and a magnetic flux phase estimated value to output an output voltage command; a switching pattern generating unit for generating a signal for PWM driving the power converter from the output voltage command; and a speed estimating unit for estimating the speed estimated value and the magnetic flux phase estimated value from the output voltage command and the coordinate transformed current detected value, wherein a speed deviation limiting unit is provided for liming a speed deviation not to generate an acceleration not lower than the speed estimating capability of an all-dimensional magnetic flux speed observer when the speed deviation as a deviation between the arbitrary speed command as an input of the speed control unit and the speed estimated value is inputted to the speed control unit, and inputting the limited speed deviation to the speed control unit.

Specifically, the speed deviation value inputted to the speed control unit is limited by the speed liming unit from a time during which the a.c. motor can be accelerated in the shortest time and a time during which the speed estimating unit can be accelerated in the shortest time. Accordingly, even when the a.c. motor is abruptly accelerated or decelerated, the speed can be controlled in a stable way.

In a specific enhancement the speed estimating unit is an all-dimensional magnetic flux speed observer including an all-dimensional observer and a speed estimator.

In a specific enhancement, the speed is estimated by the all-dimensional magnetic flux speed observer so that the speed estimated value can be made to correspond to the arbitrary speed command.

As described above, in the first vector control method and the vector controller for an a.c. motor without using a sensor according to the present invention, since the speed estimated value or the magnetic flux estimated value of the all-dimensional magnetic flux speed observer can be made to correspond to the speed or the magnetic flux of an actual a.c. motor, speed can be accurately estimated even in the a.c. motor that is liable to be magnetically saturated and a speed accuracy or a torque accuracy can be effectively improved.

Further, in the second vector control method and the vector controller for an a.c. motor without using a sensor according to the present invention, the speed deviation value inputted to the speed control unit is limited from a time during which the a.c. motor can be accelerated in the shortest time and a time during which the speed estimating unit can be accelerated in the shortest time. Accordingly, even when the a.c. motor is abruptly accelerated or decelerated, the speed can be effectively controlled in a stable way.

BRIEF DESCRIPTION OF THE DRAWINGS

In the subscript hut of reference numeral designates an estimated value and ref designates a command value in formulas and the drawings.

BEST MODE FOR CARRYING OUT THE INVENTION

Now, embodiments of the present invention will be described by referring to the drawings.

FIRST EMBODIMENT

Figure 1:
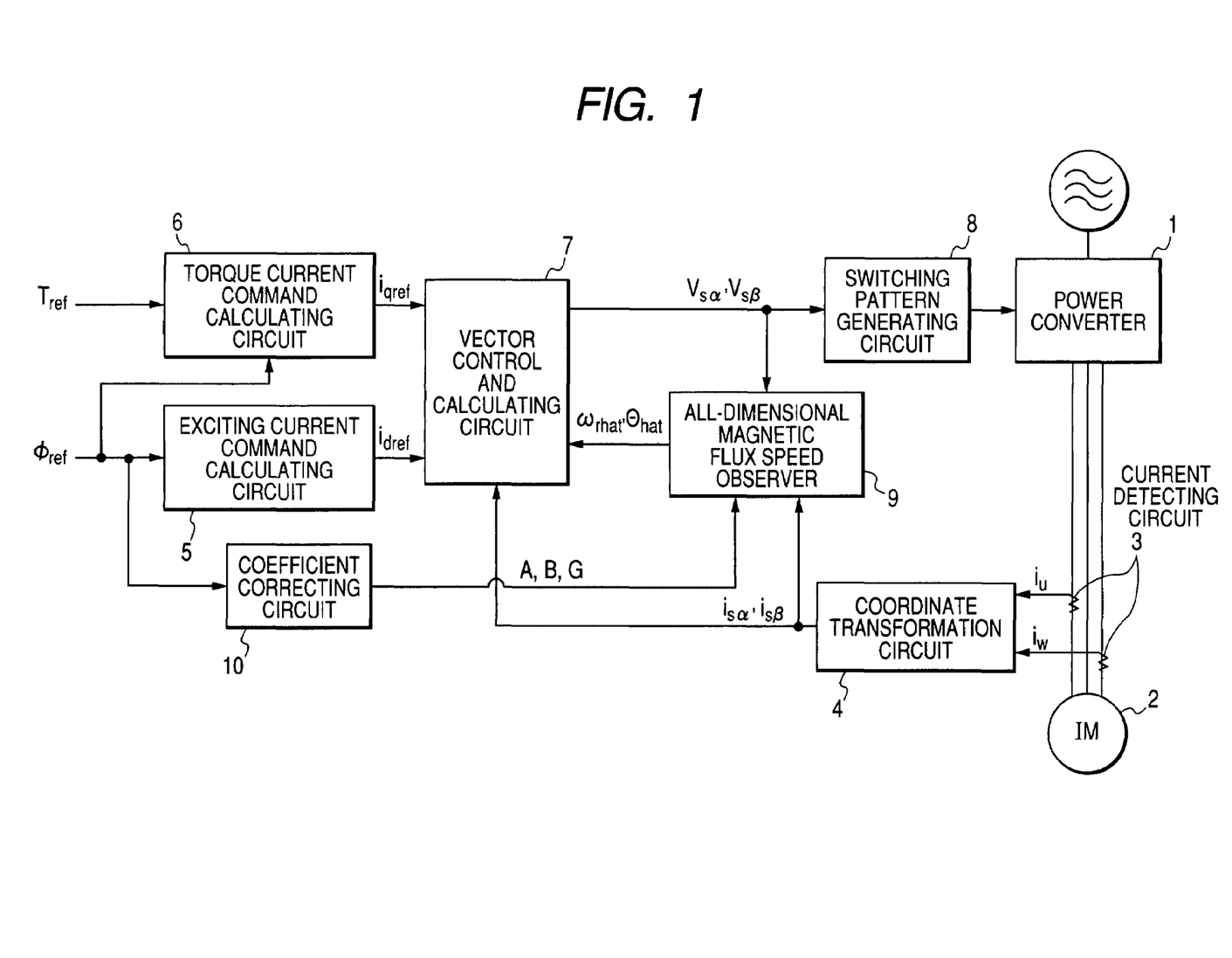
FIG. 1 is a block diagram showing a structure of a vector controller for an a.c. motor without using a sensor according to a first embodiment of the present invention.
Figure 2:
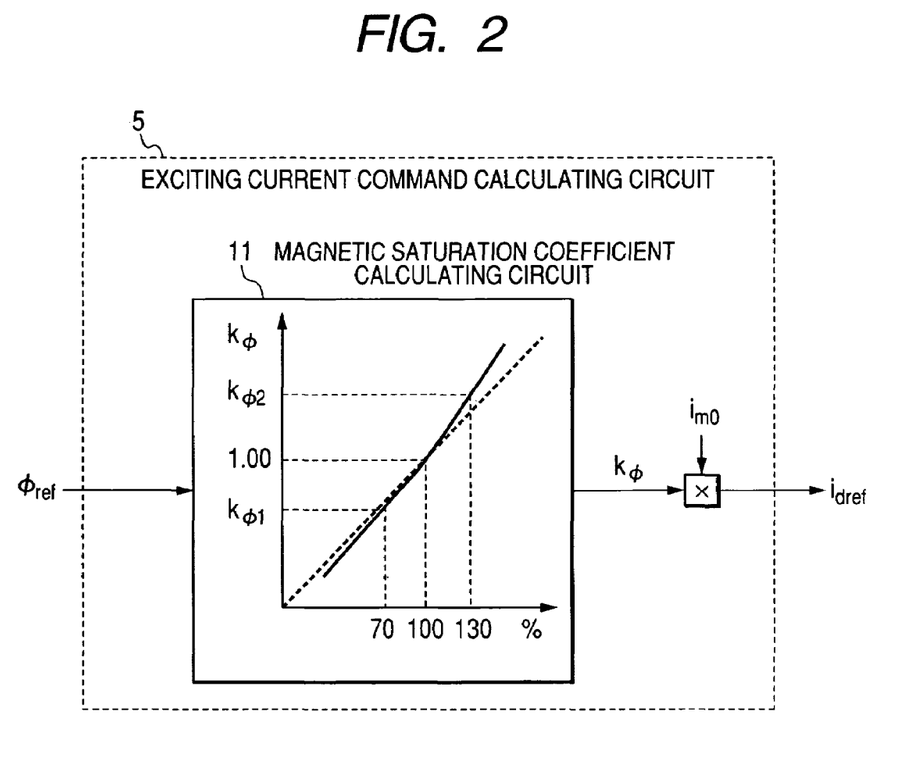
FIG. 2 is a block diagram of an exciting current command calculating circuit in the first embodiment.
Figure 3:
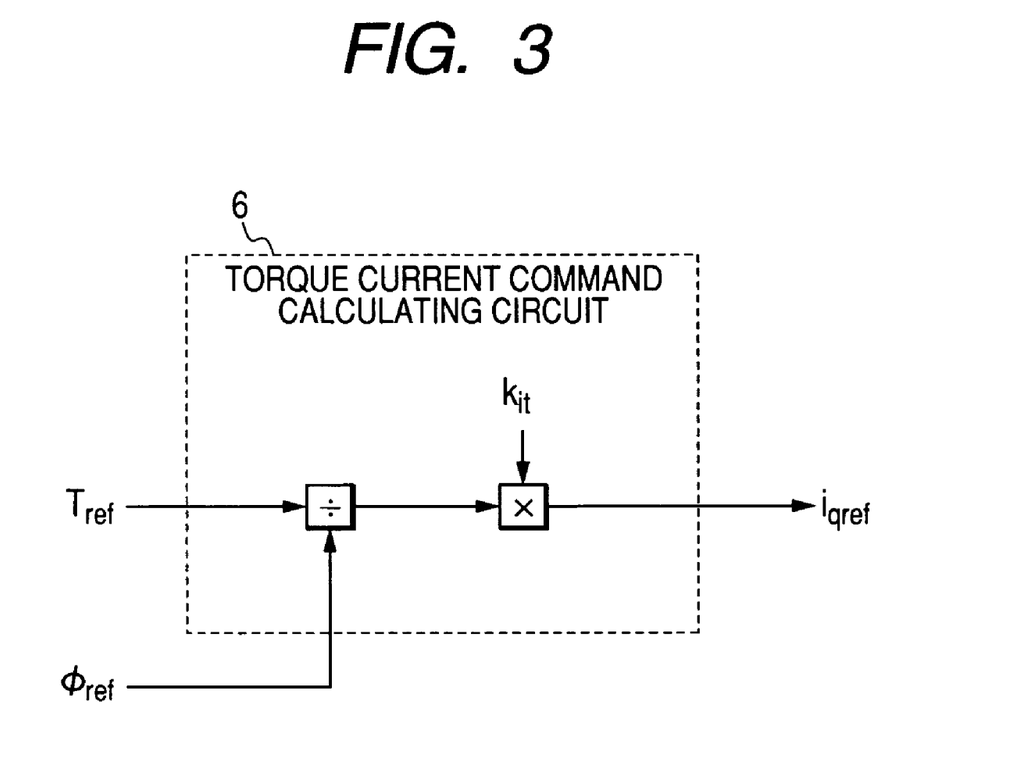
FIG. 3 is a block diagram of a torque current command calculating circuit in the first embodiment.

FIG. 1 is a block diagram showing the structure of a first embodiment of a vector controller for an a.c. motor without using a sensor in the present invention. FIG. 2 is a block diagram showing the structure of an exciting current command calculating circuit. FIG. 3 is a block diagram showing the structure of a torque current command calculating circuit.

The vector controller for an a.c. motor without using a sensor in this embodiment includes a power converter 1 for converting three-phase alternating current to d.c. voltage by a power element, converting the d.c. voltage to an alternating current having an arbitrary frequency and voltage by a PWM control system and outputting the alternating current, an induction motor 2 as one kind of the a.c. motor that is driven by the alternating current outputted from the power converter 1, a current detecting circuit 3 for detecting the current supplied to the induction motor , a coordinate transformation circuit 4 for outputting primary current detected values $i_{s\alpha}$, $i_{s\beta}$ that are obtained by performing a three-phase to two-phase transformation of the current detected in the current detecting circuit in a stator coordinate system, an exciting current command calculating circuit 5 that inputs an arbitrary magnetic flux command $\Phi_{ref}$ as shown in FIG. 2 and calculates an exciting current command $i_{dref}$ from the product of a magnetic saturation coefficient $k_\phi$ outputted from an iron core saturation coefficient calculating circuit 11 by no-load current $I_{m0}$ at the time of the magnetic flux command of 100%, a torque current command calculating circuit 6 in which an arbitrary torque command $T_{ref}$ is divided by the arbitrary magnetic flux command $\Phi_{ref}$ as shown in FIG. 3 to calculate a torque current command $i_{qref}$ from the product of the obtained value and a torque current conversion factor $k_{it}$, a vector control and calculating circuit 7 for controlling and calculating a vector from the exciting current command $i_{dref}$, the torque current command $i_{qref}$, the primary current detected values $i_{s\alpha}$, $i_{s\beta}$ and a speed estimated value $\omega_{rhat}$ and a magnetic flux phase estimated value $\theta_{hat}$ outputted a below-described all-dimensional magnetic flux speed observer 9 to output output voltage commands $V_{s\alpha}$, $V_{s\beta}$, a switching pattern generating circuit 8 for generating a signal for driving the power converter 1 from the output voltage commands $V_{s\alpha}$, $V_{s\beta}$, an-all dimensional magnetic flux speed observer 9 that employs the output voltage commands $V_{s\alpha}$, $V_{s\beta}$ and the primary current detected values $i_{s\alpha}$, $i_{s\beta}$ as inputs and solves the voltage and current equation of the induction motor by the successive forms of an all-dimensional observer to estimate primary current estimated values $i_{s\alpha hat}$, $i_{s\beta hat}$ and magnetic flux estimated values $\Phi_{r\alpha hat}$, $\Phi_{r\beta hat}$ and estimate the speed estimated value $\omega_{rhat}$ and the magnetic flux phase estimated value $\theta_{hat}$ from the primary current detected values $i_{s\alpha}$, $i_{s\beta}$, the primary current estimated values $i_{s\alpha hat}$, $i_{s\beta hat}$ and the magnetic flux estimated values $\Phi_{r\alpha hat}$, $\Phi_{r\beta hat}$ and a coefficient correcting circuit 10 for correcting and outputting a coefficient changing in accordance with a magnetic saturation property respectively in elements of matrixes A, B and G of the all-dimensional magnetic flux speed observer 9 in accordance with the arbitrary magnetic flux command $\Phi_{ref}$.

In this embodiment, the all-dimensional magnetic flux speed observer 9 includes the all-dimensional observer and a speed estimator derived from the voltage and current equation of the induction motor. The all-dimensional observer includes below-described components.

$$\frac{d}{dt}\begin{bmatrix} i_{\alpha hat} \\ i_{s\beta hat} \\ \Phi_{r\alpha hat} \\ \Phi_{r\beta hat} \end{bmatrix} = \begin{bmatrix} a_{r11} & 0 & a_{r12} & -a_{i12}\omega_{rhat} \\ 0 & a_{r11} & a_{i12}\omega_{rhat} & a_{r12} \\ a_{r21} & 0 & a_{r22} & -a_{i22}\omega_{rhat} \\ 0 & a_{r21} & a_{i22}\omega_{rhat} & a_{r22} \end{bmatrix}\begin{bmatrix} i_{\alpha hat} \\ i_{s\beta hat} \\ \Phi_{r\alpha hat} \\ \Phi_{r\beta hat} \end{bmatrix} + \begin{bmatrix} b_{11} & 0 \\ 0 & b_{11} \\ 0 & 0 \\ 0 & 0 \end{bmatrix}\begin{bmatrix} V_{s\alpha} \\ V_{s\beta} \end{bmatrix} + \begin{bmatrix} g_1 & -g_2 \\ g_2 & g_1 \\ g_3 & -g_4 \\ g_4 & g_3 \end{bmatrix}\begin{bmatrix} i_{s\alpha} - i_{s\alpha hat} \\ i_{s\beta} - i_{s\beta hat} \end{bmatrix} \quad (1)$$

Here, $a_{r11} = -R_s/(\sigma L_s) - (1-\sigma)/(\sigma \tau_r)$ $a_{r12} = -(1/\rho) \cdot 1/\tau_r$ $a_{i12} = 1/\rho$ $a_{r21} = L_m/\tau_r$ $a_{r22} = -1/\tau_r$ $a_{i22} = 1$ $b_{11} = 1/\sigma L_s$ $g_1 = (L-1)(1/\sigma)(R_s/L_s + 1/\tau_r)$ $g_2 = -(L-1)$ $g_3 = L(L-1)(L_r R_s/L_m) - (L-1)(L_s R_r/L_m)$ $g_4 = -(L-1)\rho$ $\sigma = 1 - L_m^2/(L_s \cdot L_r)$ $\tau_r = L_r/R_r$ $\rho = -(\sigma \cdot L_s \cdot L_r)/L_m$ $R_s$: primary resistance
$R_r$: secondary resistance
$L_m$: mutual inductance
$L_s$: primary self-inductance
$L_r$: secondary self-inductance
$\omega_{rhat}$: speed estimated value
L: observer gain
$i_{s\alpha}$: α shaft component of primary current detected value
$i_{s\beta}$: β shaft component of primary current detected value
$V_{s\alpha}$: α shaft component of primary voltage
$V_{s\beta}$: β shaft component of primary voltage
$i_{s\alpha hat}$: α shaft component of primary current estimated value
$i_{s\beta hat}$: β shaft component of primary current estimated value
$\Phi_{r\alpha hat}$: α shaft component of magnetic flux estimated value
$\Phi_{r\beta hat}$: β shaft component of magnetic flux estimated value The speed estimated value $\omega_{rhat}$ can be estimated from the primary current detected values $i_{s\alpha}$ and $i_{s\beta}$, the primary current estimated values $\Phi_{r\alpha hat}$ and $\Phi_{r\beta hat}$ and the magnetic flux estimated values $\Phi_{r\alpha hat}$ and $\Phi_{r\beta hat}$ as shown in a below-described formula.

$$\omega_{rhat} = k_{\omega p}\{\Phi_{r\beta hat}(i_{s\alpha} - i_{s\alpha hat}) - \Phi_{r\alpha hat}(i_{s\beta} - i_{s\beta hat})\} + k_{\omega i}\int\{\Phi_{r\beta hat}(i_{s\alpha} - i_{s\alpha hat}) - \Phi_{r\alpha hat}(i_{s\beta} - i_{s\beta hat})\}dt \quad (2)$$

Actually, to realize on software, a discrete process is carried out. A speed estimated value $\omega_{rhat}(k)$ at the time of $kT_s$ ($T_s$: a sampling time) can be estimated in accordance with a below-described formula obtained by performing a discrete process of the formula (2) from primary current detected values $i_{s\alpha}(k)$ and $i_{s\beta}(k)$, primary current estimated values $i_{s\alpha hat}(k)$ and $i_{s\beta hat}(k)$ and magnetic flux estimated values $\Phi_{r\alpha hat}(k)$ and $\Phi_{r\beta hat}(k)$.

$$\omega_{rhat} = k_{\omega p}(k)\{\Phi_{r\beta hat}(k)(i_{s\alpha}(k) - i_{s\alpha hat}(k)) - \Phi_{r\alpha hat}(k)(i_{s\beta}(k) - i_{s\beta hat}(k))\} + \sum_{n=1}^{k} k_{\omega i}\{\Phi_{r\beta hat}(n)(i_{s\alpha}(n) - i_{s\alpha hat}(n)) - \Phi_{r\alpha hat}(n)(i_{s\beta}(n) - i_{s\beta hat}(n))\} \quad (3)$$

Similarly, in accordance with the successive formulas of a below-described formula (4) obtained from regressive differences of the all-dimensional magnetic flux observer of the formula (1), primary current estimated values $i_{s\alpha hat}(k+1)$ and $i_{s\beta hat}(k+1)$ and magnetic flux estimated values $\Phi_{r\alpha hat}(k+1)$ and $\Phi_{r\beta hat}(k+1)$ at the time of $(k+1)T_s$ are estimated.

$$\begin{bmatrix} i_{s\alpha hat}(k+1) \\ i_{s\beta hat}(k+1) \\ \Phi_{r\alpha hat}(k+1) \\ \Phi_{r\beta hat}(k+1) \end{bmatrix} = \begin{bmatrix} 1+a_{r11}T_s & 0 & a_{r12}T_s & -a_{i12}\omega_{rhat}(k)T_s \\ 0 & 1+a_{r11}T_s & a_{i12}\omega_{rhat}(k)T_s & a_{r12}T_s \\ a_{r21}T_s & 0 & 1+a_{r22}T_s & -a_{i22}\omega_{rhat}(k)T_s \\ 0 & a_{r21}T_s & a_{i22}\omega_{rhat}(k)T_s & a_{r22}T_s \end{bmatrix}\begin{bmatrix} i_{s\alpha hat}(k) \\ i_{s\beta hat}(k) \\ \Phi_{r\alpha hat}(k) \\ \Phi_{r\beta hat}(k) \end{bmatrix} + \begin{bmatrix} b_{11}T_s & 0 \\ 0 & b_{11}T_s \\ 0 & 0 \\ 0 & 0 \end{bmatrix}\begin{bmatrix} V_{s\alpha}(k) \\ V_{s\beta}(k) \end{bmatrix} + \begin{bmatrix} g_1 T_s & -g_2 T_s \\ g_2 T_s & g_1 T_s \\ g_3 T_s & -g_4 T_s \\ g_4 T_s & g_3 T_s \end{bmatrix}\begin{bmatrix} i_{s\alpha}(k) - i_{s\alpha hat}(k) \\ i_{s\beta}(k) - i_{s\beta hat}(k) \end{bmatrix} \quad (4)$$

Further, a magnetic flux phase estimated value $\theta_{hat}(k+1)$ is estimated by a below-described formula (5)

$$\theta_{hat}(k+1) = \tan^{-1}(\Phi_{r\beta hat}(k+1)/\Phi_{r\alpha hat}(k+1)) \quad (5)$$

In the all-dimensional observer, the matrixes A, B and G are respectively defined as described below.

$$A = \begin{bmatrix} 1+a_{r11}T_s & 0 & a_{r12}T_s & -a_{i12}\omega_{rhat}(k)T_s \\ 0 & 1+a_{r11}T_s & a_{i12}\omega_{rhat}(k)T_s & a_{r12}T_s \\ a_{r21}T_s & 0 & 1+a_{r22}T_s & -a_{i22}\omega_{rhat}(k)T_s \\ 0 & a_{r21}T_s & a_{i22}\omega_{rhat}(k)T_s & a_{r22}T_s \end{bmatrix} \quad (6)$$

$$B = \begin{bmatrix} b_{11}T_s & 0 \\ 0 & b_{11}T_s \\ 0 & 0 \\ 0 & 0 \end{bmatrix} \quad (7)$$

-continued $$G = \begin{bmatrix} g_1 T_s & -g_2 T_s \\ g_2 T_s & g_1 T_s \\ g_3 T_s & -g_4 T_s \\ g_4 T_s & g_3 T_s \end{bmatrix} \quad (8)$$

Here, as defined in the formula (1), $a_{11}$, $a_{r12}$, $a_{i12}$, $a_{r21}$, $a_{r22}$, $a_{i22}$, $b_{11}$, $g_1$, $g_2$, $g_3$ and $g_4$ are calculated by the primary resistance $R_s$, the secondary resistance $R_r$, the mutual inductance $L_m$, the primary self-inductance $L_s$, and the secondary self-inductance $L_r$. Ordinarily, these coefficients are calculated as constant values during an initial process and calculated as fixed values upon calculation of the all-dimensional observer.

Generally, the all-dimensional magnetic flux speed observer 9 is used so that the speed of the induction motor can be accurately estimated. However, when the induction motor is liable to be magnetically saturated, the speed estimated value or the magnetic flux estimated value of the all-dimensional magnetic flux observer 9 do not correspond to the actual value of the motor. Thus, the induction motor is undesirably unstable and may not be occasionally started.

The magnetic saturation property of the induction motor is previously defined in the magnetic saturation coefficient calculating circuit. Here, assuming that a magnetic saturation coefficient at the time of the magnetic flux command of 100% is 1.0, the magnetic saturation property is represented by a linear approximation by using a magnetic saturation coefficient $k_{\phi 1}$ at the time of the magnetic flux command of 70% and a magnetic flux coefficient $k_{\phi 2}$ at the time of the magnetic flux command of 130%. When the induction motor is hardly magnetically saturated, $k_{\phi 1}=0.7$ and $k_{\phi 2}=1.3$. However, when the induction motor is liable to be magnetically saturated, $k_{\phi 1}<0.7$ and $k_{\phi 2}>1.3$. When the induction motor is more liable to be magnetically saturated, $k_{\phi 1}$, becomes smaller and $k_{\phi 2}$ becomes larger. Here, when the ratio $K_m$ of the magnetic flux command $\Phi_{ref}$ to the magnetic saturation coefficient $k_\phi$ as shown by a below-described formula (9) comes near to 1, the magnetic saturation hardly arises and when the ratio $K_m$ is smaller than 1, the magnetic saturation is liable to arise.

$$k_m = \Phi_{ref}/k_\phi \quad (9)$$

The ratio $K_m$ of the magnetic flux command $\Phi_{ref}$ to the magnetic saturation coefficient $k_\phi$ indicates the magnetic saturation property of the mutual inductance $L_m$.

This embodiment aims to perform the calculation of the all-dimensional magnetic flux speed observer 9 by considering the magnetic saturation property of the mutual inductance $L_m$.

The mutual inductance $L_m$ relative to an arbitrary magnetic flux command $\Phi_{ref}$ is expressed by a below-described formula (10).

$$L_m = L_{m0} k_m \quad (10)$$

In this case, $L_{m0}$ is calculated as the mutual inductance at the time of the magnetic flux command $\Phi_{ref}$ of 100%. When the above-described formula is substituted for $a_{r11}$, $a_{r12}$, $a_{i12}$, $a_{r21}$, $a_{r22}$, $a_{i22}$, $b_{11}$, $g_1$, $g_2$, $g_3$ and $g_4$ to perform a calculation, an enormous quantity of calculation is required. Thus, $a_{r110}$, $a_{r120}$, $a_{i120}$, $a_{r210}$, $a_{r220}$, $a_{i220}$, $b_{110}$, $g_{10}$, $g_{20}$, $g_{30}$ and $g_{40}$ at the time of the magnetic flux command $\Phi_{ref}=100\%$ are previously calculated from the mutual inductance $L_{m0}$ at the time of the magnetic flux command $\Phi_{ref}=100\%$. When the magnetic flux command $\Phi_{ref}$ is given, the previously calculated values are approximated and changed so as to obtain a below-described formula (11).

$$a_{r11} = a_{r110}$$

$$a_{r12} = a_{r120}/k_m$$

$$a_{i12} = a_{i120}$$

$$a_{r21} = a_{r210}$$

$$a_{r22} = a_{r220}/k_m$$

$$a_{i22} = a_{i220}$$

$$b_{11} = b_{110}$$

$$g_1 = g_{10}$$

$$g_2 = g_{20}$$

$$g_3 = g_{30}$$

$$g_4 = g_{40} \quad (11)$$

Thus, the speed estimated value or the magnetic flux estimated value of the all-dimensional magnetic flux speed observer 9 can be made to correspond to the actual speed or the magnetic flux of the induction motor. Accordingly, the vector control method and the vector controller for the induction motor without using a sensor can be obtained in which the speed can be accurately estimated even in the induction motor liable to be magnetically saturated.

SECOND EMBODIMENT

Figure 4:
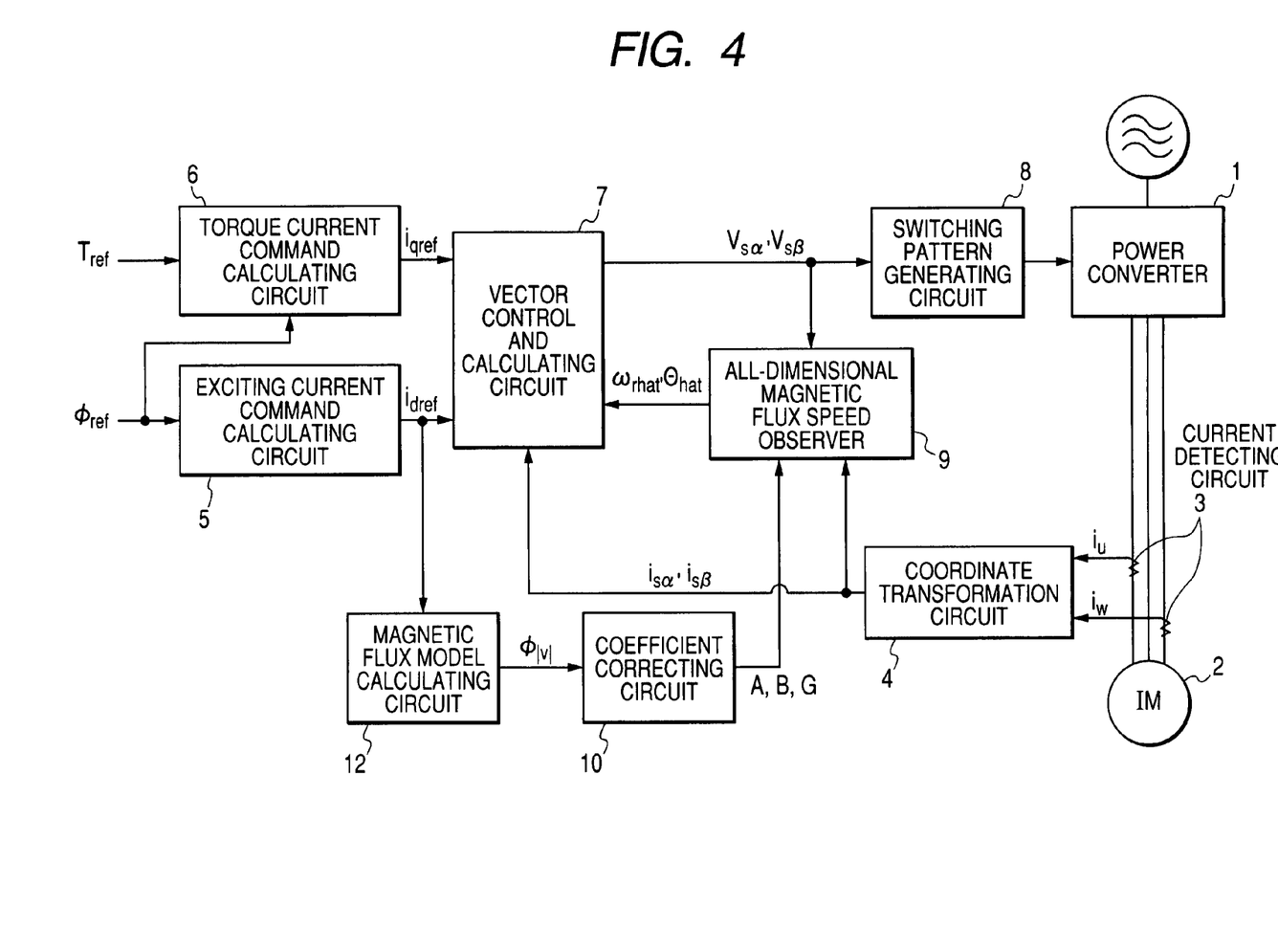
FIG. 4 is a block diagram showing a structure of a vector controller for an a.c. motor without using a sensor according to a second embodiment of the present invention.

Now, a second embodiment of the present invention will be described be described by referring to the drawings. FIG. 4 is a block diagram showing a structure of a vector controller for an a.c. motor without using a sensor in the second embodiment.

A feature of this embodiment resides in that a magnetic flux model calculating circuit 12 is provided for calculating a magnetic flux level $\Phi_{1v1}$ by using an exciting current command $i_{dref}$ as an output of an exciting current command calculating circuit 5 to supply the magnetic flux level to a coefficient correcting circuit 10. Other structures are the same as those of the first embodiment shown in FIG. 1, an explanation thereof is omitted.

In the above-described first embodiment, for an arbitrary magnetic flux command $\Phi_{ref}$, the ratio $k_m$ of the magnetic flux command $\Phi_{ref}$ to the magnetic saturation coefficient $k_\phi$ is calculated in accordance with the formula (8). Thus, the coefficients changing by the magnetic saturation property respectively in the elements of the matrixes A, B and G of the all-dimensional magnetic flux speed observer 9 are corrected in accordance with the formula (11). However, the second embodiment takes it into consideration that since the magnetic flux of an induction motor can be changed only by the time constant of a second circuit, even when a magnetic flux command $\Phi_{ref}$ suddenly changes, an actual magnetic flux cannot be followed.

A below-described ratio $k_m$ of the magnetic flux level $\Phi_{1v1}$ outputted from the magnetic flux model calculating circuit 12 to a magnetic saturation coefficient $k_\phi$ is calculated.

$$k_m = \Phi_{1v1}/k_\phi \quad (12)$$

Then, $a_{r110}$, $a_{r120}$, $a_{i120}$, $a_{r210}$, $a_{r220}$, $a_{i220}$, $b_{110}$, $g_{10}$, $g_{20}$, $g_{30}$ and $g_{40}$ at the time of the magnetic flux level $\Phi_{1v1}=100\%$ are previously calculated. When the magnetic flux level $\Phi_{1v1}$ is given, the previously calculated values are approximated and changed so as to obtain a below-described formula (13).

$$a_{r11}=a_{r110}$$
$$a_{r12}=a_{r120}/k_m$$
$$a_{i12}=a_{i120}$$
$$a_{r21}=a_{r210}$$
$$a_{r22}=a_{r220}/k_m$$
$$a_{i22}=a_{i220}$$
$$b_{11}=b_{110}$$
$$g_1=g_{10}$$
$$g_2=g_{20}$$
$$g_3=g_{30}$$
$$g_4=g_{40} \quad (13)$$

Thus, the speed estimated value or the magnetic flux estimated value of an all-dimensional magnetic flux speed observer 9 can be made to correspond to the actual speed or the magnetic flux of the induction motor. Accordingly, the vector control method and the vector controller for the induction motor without using a sensor can be obtained in which the speed can be accurately estimated even in the induction motor liable to be magnetically saturated.

In the above described first embodiment and the second embodiment, the primary current estimated value and the magnetic flux estimated value are estimated in the all-dimensional magnetic flux speed observer. However, even when the voltage and current equation is deformed to calculate a secondary field current estimated value as a current for forming the primary current estimated value and the magnetic flux, the same effect as described above may be realized.

Further, in the above-described embodiments, the input of the all-dimensional magnetic flux speed observer is used as the output voltage command, however, a voltage detected value using a voltage detector may be used in place thereof with the same effect.

Further, the above-described embodiments propose the controller without using a speed sensor. However, even when the all-dimensional magnetic flux speed observer is employed to control a magnetic flux in a controller with a speed sensor, the same effect may be realized. Further, when a speed estimating method employs a method proposed in JP-A-Hei08-205599, the same effect may be obtained. Further, in the above-described embodiments, the magnetic saturation property of the iron core saturation coefficient calculating circuit is approximated in arbitrary three points. However, when the magnetic saturation property is approximated in multi-points, when the magnetic saturation property is given by an arbitrary function, or when the magnetic saturation property is tabulated to use a table, a higher effect may be obtained.

THIRD EMBODIMENT

Figure 5:
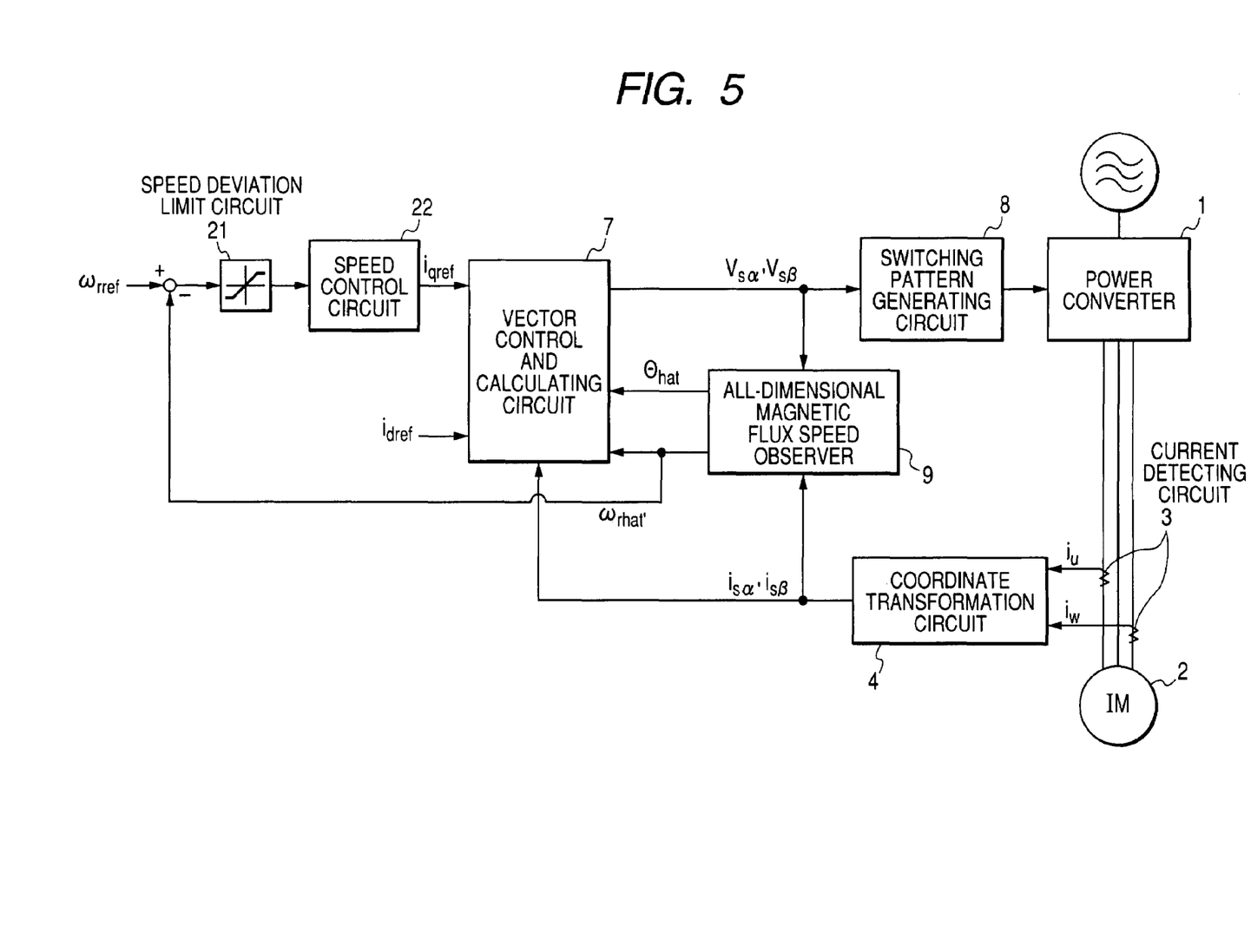
FIG. 5 is a block diagram showing a structure of a vector controller for an a.c. motor without using a sensor according to a third embodiment of the present invention.

FIG. 5 is a block diagram showing the structure of a vector controller for an a.c. motor without using a sensor according to a third embodiment.

The vector controller for an a.c. motor without using a sensor in this embodiment includes a power converter 1 for converting three-phase alternating current to d.c. voltage by a power element, converting the d.c. voltage to an alternating current having an arbitrary frequency and voltage by a PWM control system and outputting the alternating current, an induction motor 2 as one kind of the a.c. motor that is driven by the alternating current outputted from the power converter 1, a current detecting circuit 3 for detecting the current supplied to the induction motor , a coordinate transformation circuit 4 for outputting primary current detected values $i_{s\alpha}$, $i_{s\beta}$, that are obtained by performing a three-phase to two-phase transformation of the current detected in the current detecting circuit in a stator coordinate system, a speed deviation limit circuit 21 for limiting a deviation between an arbitrary speed command and the speed estimated value of the induction motor, a speed control circuit 22 for outputting a torque current command so that the speed deviation is zero, that is, the arbitrary speed command corresponds to the speed estimated value of the induction motor, a vector control and calculating circuit 7 for controlling and calculating a vector from the exciting current command $i_{dref}$, the torque current command $i_{qref}$, the primary current detected values $i_{s\alpha}$, $i_{s\beta}$, and a speed estimated value $\omega_{rhat}$ and a magnetic flux phase estimated value $\theta_{hat}$ outputted from a below-described all-dimensional magnetic flux speed observer 9 to output output voltage commands $V_{s\alpha}$, $V_{s\beta}$, a switching pattern generating circuit 8 for generating a signal for driving the power converter 1 from the output voltage commands $V_{s\alpha}$, $V_{s\beta}$, an-all dimensional magnetic flux speed observer 9 that employs the output voltage commands $V_{s\alpha}$, $V_{s\beta}$ and the primary current detected values $i_{s\alpha}$, $i_{s\beta}$ as inputs and solves the voltage and current equation of the induction motor by the successive forms of an all-dimensional observer to estimate primary current estimated values $i_{s\alpha hat}$, $i_{s\beta hat}$ and magnetic flux estimated values $\Phi_{r\alpha hat}$, $\Phi_{r\beta hat}$ and estimate the speed estimated value $\omega_{rhat}$ and the magnetic flux phase estimated value $\theta_{hat}$ from the primary current detected values $i_{s\alpha}$, $i_{s\beta}$, the primary current estimated values $i_{s\alpha hat}$, $i_{s\beta hat}$ and the magnetic flux estimated values $\Phi_{r\alpha hat}$, $\Phi_{r\beta hat}$.

In this embodiment, the all-dimensional magnetic flux speed observer 9 includes the all-dimensional observer and a speed estimator derived from the voltage and current equation of the induction motor. The all-dimensional observer includes below-described components.

$$\frac{d}{dt}\begin{bmatrix} i_{\alpha\alpha hat} \\ i_{s\beta hat} \\ \Phi_{r\alpha hat} \\ \Phi_{r\beta hat} \end{bmatrix} = \begin{bmatrix} a_{r11} & 0 & a_{r12} & -a_{i12}\omega_{rhat} \\ 0 & a_{r11} & a_{i12}\omega_{rhat} & a_{r12} \\ a_{r21} & 0 & a_{r22} & -a_{i22}\omega_{rhat} \\ 0 & a_{r21} & a_{i22}\omega_{rhat} & a_{r22} \end{bmatrix}\begin{bmatrix} i_{\alpha\alpha hat} \\ i_{s\beta hat} \\ \Phi_{r\alpha hat} \\ \Phi_{r\beta hat} \end{bmatrix} + \begin{bmatrix} b_{11} & 0 \\ 0 & b_{11} \\ 0 & 0 \\ 0 & 0 \end{bmatrix}\begin{bmatrix} V_{s\alpha} \\ V_{s\beta} \end{bmatrix} + \begin{bmatrix} g_1 & -g_2 \\ g_2 & g_1 \\ g_3 & -g_4 \\ g_4 & g_3 \end{bmatrix}\begin{bmatrix} i_{s\alpha}-i_{s\alpha hat} \\ i_{s\beta}-i_{s\beta hat} \end{bmatrix} \quad (14)$$

Here, $$a_{r11}=-R_s/(\sigma L_s)-(1-\sigma)/(\sigma \tau_r)$$
$$a_{r12}=-(1/\rho)\cdot 1/\tau_r$$
$$a_{i12}=1/\rho$$
$$a_{r21}=L_m/\tau_r$$
$$a_{r22}=-1/\tau_r$$

$a_{i22}=1$ $b_{11}=1/\sigma L_s$ $g_1=(L-1)(1/\sigma)(R_s/L_s+1/\tau_r)$ $g_2=-(L-1)$ $g_3=L(L-1)(L_rR_s/L_m)-(L-1)(L_sR_r/L_m)$ $g_4=-(L-1)\rho$ $\sigma=1-L_m^2/(L_s \cdot L_r)$ $\tau_r=L_r/R_r$ $\rho=-(\sigma \cdot L_s \cdot L_r)/L_m$ $R_s$: primary resistance
$R_r$: secondary resistance
$L_m$: mutual inductance
$L_s$: primary self-inductance
$L_r$: secondary self-inductance
$\omega_{rhat}$: speed estimated value
$L$: observer gain
$i_{s\alpha}$: α shaft component of primary current detected value
$i_{s\beta}$: β shaft component of primary current detected value
$V_{s\alpha}$: α shaft component of primary voltage
$V_{s\beta}$: β shaft component of primary voltage
$i_{s\alpha hat}$: α shaft component of primary current estimated value
$i_{s\beta hat}$: β shaft component of primary current estimated value
$\Phi_{r\alpha hat}$: α shaft component of magnetic flux estimated value
$\Phi_{r\beta hat}$: β shaft component of magnetic flux estimated value The speed estimated value $\omega_{rhat}$ can be estimated from the primary current detected values $i_{s\alpha}$ and $i_{s\beta}$, the primary current estimated values $i_{s\alpha hat}$ and $i_{s\beta hat}$ and the magnetic flux estimated values $\Phi_{r\alpha hat}$ and $\Phi_{r\beta hat}$ in accordance with a below-described formula.

$$\omega_{rhat}=k_{\omega p}\{\Phi_{r\beta hat}(i_{s\alpha}-i_{s\alpha hat})-\Phi_{r\alpha hat}(i_{s\beta}-i_{s\beta hat})\}+k_{\omega i}\int\{\Phi_{r\beta hat}(i_{s\alpha}-i_{s\alpha hat})-\Phi_{r\alpha hat}(i_{s\beta}-i_{s\beta hat})\}dt \quad (15)$$

Actually, to realize on software, a discrete process is carried out. A speed estimated value $\omega_{rhat}(k)$ at the time of $kT_s$ ($T_s$: a sampling time) can be estimated in accordance with a below-described formula obtained by performing a discrete process of the formula (15) from primary current detected values $i_{s\alpha}(k)$ and $i_{s\beta}(k)$, primary current estimated values $i_{s\alpha hat}(k)$ and $i_{s\beta hat}(k)$ and magnetic flux estimated values $\Phi_{r\alpha hat}(k)$ and $\Phi_{r\beta hat}(k)$.

$$\omega_{rhat} = k_{\omega p}(k)\{\Phi_{r\beta hat}(k)(i_{s\alpha}(k) - i_{s\alpha hat}(k)) - \Phi_{r\alpha hat}(k)(i_{s\beta}(k) - i_{s\beta hat}(k))\} + \sum_{n=1}^{k} k_{\omega i}\{\Phi_{r\beta hat}(n)(i_{s\alpha}(n) - i_{s\alpha hat}(n)) - \Phi_{r\alpha hat}(n)(i_{s\beta}(n) - i_{s\beta hat}(n))\} \quad (16)$$

Similarly, in accordance with the successive formulas of a below-described formula (17) obtained from regressive differences of the all-dimensional magnetic flux observer of the formula (14), primary current estimated values $i_{s\alpha hat}(k+1)$ and $i_{s\beta hat}(k+1)$ and magnetic flux estimated values $\Phi_{r\alpha hat}(k+1)$ and $\Phi_{r\beta hat}(k+1)$ at the time of $(k+1)T_s$ are estimated.

$$\begin{bmatrix} i_{s\alpha hat}(k+1) \\ i_{s\beta hat}(k+1) \\ \Phi_{r\alpha hat}(k+1) \\ \Phi_{r\beta hat}(k+1) \end{bmatrix} = \begin{bmatrix} 1+a_{r11}T_s & 0 & a_{r12}T_s & -a_{i12}\omega_{rhat}(k)T_s \\ 0 & 1+a_{r11}T_s & a_{i12}\omega_{rhat}(k)T_s & a_{r12}T_s \\ a_{r21}T_s & 0 & 1+a_{r22}T_s & -a_{i22}\omega_{rhat}(k)T_s \\ 0 & a_{r21}T_s & a_{i22}\omega_{rhat}(k)T_s & a_{r22}T_s \end{bmatrix} \begin{bmatrix} i_{s\alpha hat}(k) \\ i_{s\beta hat}(k) \\ \Phi_{r\alpha hat}(k) \\ \Phi_{r\beta hat}(k) \end{bmatrix} + \begin{bmatrix} b_{11}T_s & 0 \\ 0 & b_{11}T_s \\ 0 & 0 \\ 0 & 0 \end{bmatrix} \begin{bmatrix} V_{s\alpha}(k) \\ V_{s\beta}(k) \end{bmatrix} + \begin{bmatrix} g_1T_s & -g_2T_s \\ g_2T_s & g_1T_s \\ g_3T_s & -g_4T_s \\ g_4T_s & g_3T_s \end{bmatrix} \begin{bmatrix} i_{s\alpha}(k) - i_{s\alpha hat}(k) \\ i_{s\beta}(k) - i_{s\beta hat}(k) \end{bmatrix} \quad (17)$$

Further, a magnetic flux phase estimated value $\theta_{hat}(k+1)$ is estimated by a below-described formula (18).

$$\theta_{hat}(k+1)=\tan^{-1}(\Phi_{r\beta hat}(k+1)/\Phi_{r\alpha hat}(k+1)) \quad (18)$$

Now, a feature of this embodiment will be described below. In this controller, to allow the speed of the induction motor 2 to correspond to the arbitrary speed command, the all-dimensional magnetic flux speed observer 9 estimates the speed to allow the speed estimated value to correspond to the arbitrary speed command. This method ordinarily has no problem. However, when the induction motor 2 having the small capacity and a low inertia is abruptly accelerated under a state having no load, speed changes during a very little time (a sampling time). Thus, the speed estimated value in the all-dimensional magnetic flux speed observer 9 is dissociated from the actual speed of the induction motor 2. Then, an unstable control state arises, a large quantity of electric current flows or an operation is carried out under an excessively slipping state, so that the induction motor 2 cannot be operated in a stable way. Ordinarily, a sampling time is shortened or a method for improving a speed estimating system is employed. However, a case is supposed that the above-described method cannot be realized due to various limitations. This phenomenon is liable to occur particularly when an accelerating time is short or the variation of speed is large. On the other hand, even when the accelerating time is short, if the variation of speed is small, the above-described state hardly arises. Thus, a time during which the all-dimensional magnetic flux speed observer 9 can be accelerated in the shortest time is previously measured.

Then, a time during which the induction motor 2 can be accelerated in the shortest time is calculated from the inertia of the simple body of the induction motor 2 and the maximum torque that can be outputted. The time during which the induction motor 2 can be accelerated in the shortest time is compared with the previously obtained time during which the all-dimensional magnetic flux speed observer can be accelerated in the shortest time. When the time during which the induction motor 2 can be accelerated in the shortest time is longer than the latter, the limit value of the speed deviation limit circuit 21 is set as a maximum value. When the time during which the induction motor 2 can be accelerated in the shortest time is shorter than the latter, the time during which the induction motor 2 can be accelerated in the shortest time is subtracted from the previously obtained time during which the all-dimensional magnetic flux speed observer 9 can be accelerated in the shortest time. The obtained value is divided by the time during which the induction motor 2 can be accelerated in the shortest time. The maximum value of the limit value of the speed deviation limit circuit 21 is multiplied by the obtained value. Thus, an obtained value is set as the limit value of the speed deviation limit circuit 21. In such away, not only the acceleration in time shorter than the time during which the all-dimensional magnetic flux speed observer can be accelerated in the shortest time can be prevented, but also an accelerating capability can be used as much as possible when the speed deviation is small.

As described above, the speed deviation value inputted to the speed control circuit 22 is limited by the speed deviation limit circuit 21 from the time during which the induction motor 2 can be accelerated in the shortest time and the time during which the all-dimensional magnetic flux speed observer 9 can be accelerated in the shortest time. Thus, the vector control method and the vector controller for an a.c. motor without using a sensor can be obtained in which even when the induction motor 2 is abruptly accelerated and decelerated, speed can be controlled in a stable way.

FOURTH EMBODIMENT

Figure 6:
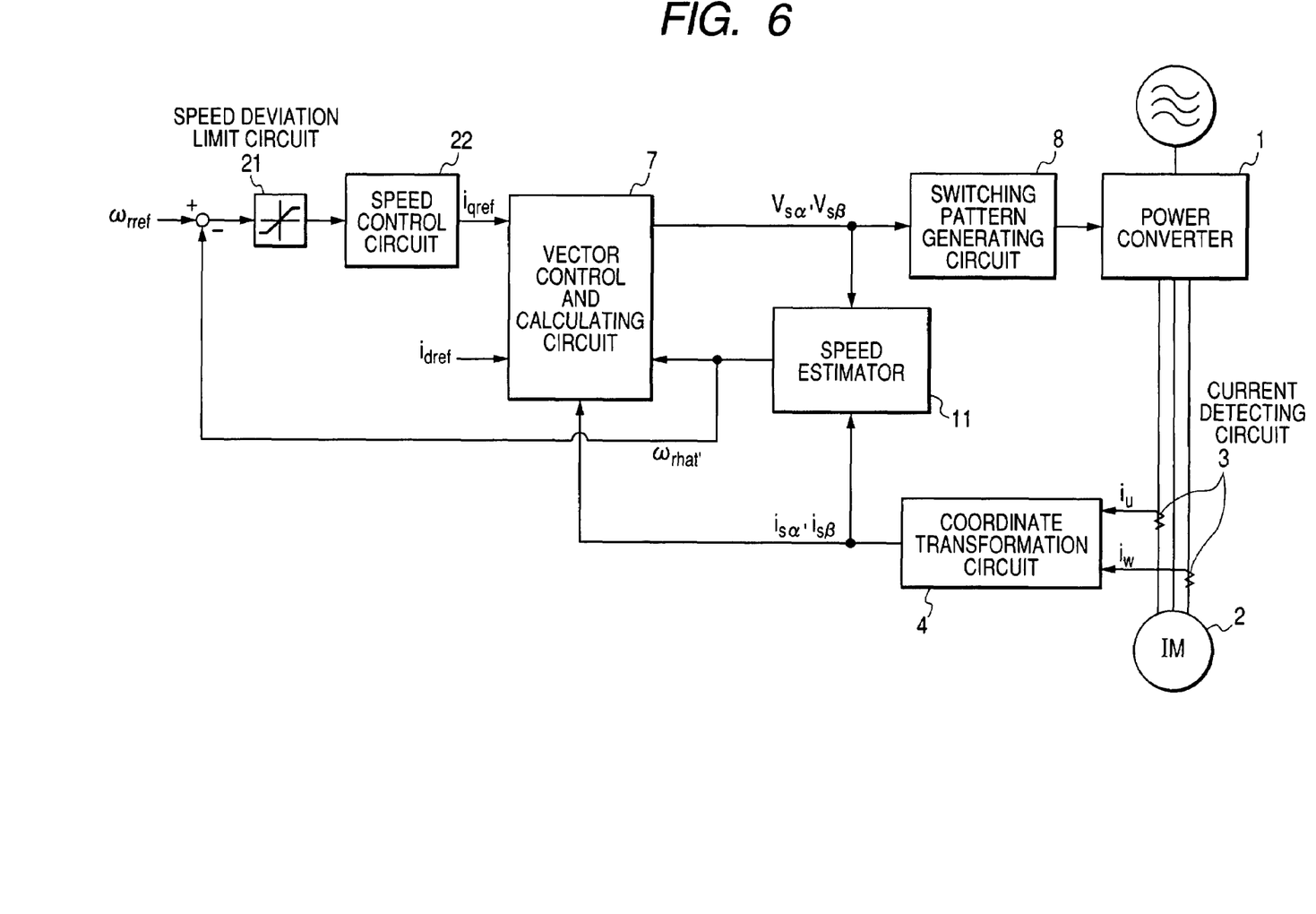
FIG. 6 is a block diagram showing a structure of a vector controller for an a.c. motor without using a sensor according to a fourth embodiment of the present invention.

FIG. 6 is a block diagram showing the structure of a vector controller for an a.c. motor without using a sensor according to this embodiment.

The vector controller for an a.c. motor without using a sensor in this embodiment includes a power converter 1 for converting three-phase alternating current to d.c. voltage by a power element, converting the d.c. voltage to an alternating current having an arbitrary frequency and voltage by a PWM control system and outputting the alternating current, an induction motor 2 as one kind of the a.c. motor that is driven by the alternating current outputted from the power converter 1, a current detecting circuit 3 for detecting the current supplied to the induction motor 2, a coordinate transformation circuit 4 for outputting primary current detected values $i_{s\alpha}$, $i_{s\beta}$ that are obtained by performing a three-phase to two-phase transformation of the current detected in the current detecting circuit in a stator coordinate system, a speed deviation limit circuit 21 for limiting a deviation between an arbitrary speed command and the speed estimated value of the induction motor, a speed control circuit 22 for outputting a torque current command so that the speed deviation is zero, that is, the arbitrary speed command corresponds to the speed estimated value of the induction motor, a vector control and calculating circuit 7 for controlling and calculating a vector from the exciting current command $i_{dref}$, the torque current command $i_{qref}$, the primary current detected values $i_{s\alpha}$, $i_{s\beta}$ and a speed estimated value $\omega_{rhat}$ outputted from a below-described speed estimator 23 to output output voltage commands $V_{s\alpha}$, $V_{s\beta}$, a switching pattern generating circuit 8 for generating a signal for driving the power converter 1 from the output voltage commands $V_{s\alpha}$, $V_{s\beta}$, and the speed estimator 23 that employs the output voltage commands $V_{s\alpha}$, $V_{s\beta}$ and the primary current detected values $i_{s\alpha}$, $i_{s\beta}$ as inputs to estimate the speed estimated value $\omega_{rhat}$ of the induction motor 2.

Now, a feature of this embodiment will be described below. In this controller, to allow the speed of the induction motor 2 to correspond to the arbitrary speed command, the speed estimator 23 estimates the speed to allow the speed estimated value to correspond to the arbitrary speed command. This method ordinarily has no problem. However, when the induction motor 2 having the small capacity and a low inertia is abruptly accelerated under a state having no load, the speed estimated value is dissociated from the actual speed of the induction motor 2. Then, an unstable control state arises, a large quantity of electric current flows or an operation is carried out under a step-out state, so that the induction motor 2 cannot be operated undesirably in a stable way. This phenomenon is liable to occur particularly when an accelerating time is short or the variation of speed is large. On the other hand, even when the accelerating time is short, if the variation of speed is small, the above-described state hardly arises.

Thus, a time during which the speed estimator can be accelerated in the shortest time is previously measured. Then, a time during which the induction motor 2 can be accelerated in the shortest time is calculated from the inertia of the simple body of the induction motor 2 and the maximum torque that can be outputted. The time during which the induction motor 2 can be accelerated in the shortest time is compared with the previously obtained time during which the speed estimator can be accelerated in the shortest time. When the time during which the induction motor 2 can be accelerated in the shortest time is longer than the latter, the limit value of the speed deviation limit circuit 21 is set as a maximum value. When the time during which the induction motor 2 can be accelerated in the shortest time is shorter than the latter, the time during which the induction motor 2 can be accelerated in the shortest time is subtracted from the previously obtained time during which the speed estimator can be accelerated in the shortest time. The obtained value is divided by the time during which the induction motor 2 can be accelerated in the shortest time. The maximum value of the limit value of the speed deviation limit circuit 21 is multiplied by the obtained value. Thus, an obtained value is set as the limit value of the speed deviation limit circuit 21.

In such a way, not only the acceleration in time shorter than the time during which the speed estimator can be accelerated in the shortest time can be prevented, but also an accelerating capability can be used as much as possible when the speed deviation is small.

As described above, the speed deviation value inputted to the speed control circuit 22 is limited by the speed deviation limit circuit 21 from the time during which the induction motor 2 can be accelerated in the shortest time and the time during which the speed estimator can be accelerated in the shortest time. Thus, the vector control method and the vector controller for an a.c. motor without using a sensor can be obtained in which even when the induction motor 2 is abruptly accelerated or decelerated, speed can be controlled in a stable way.

INDUSTRIAL APPLICABILITY

According to the first vector control method and the vector controller for an a.c. motor without using a sensor, since the speed estimated value or the magnetic flux estimated value of the all-dimensional magnetic flux speed observer can be made to correspond to the actual speed or the magnetic flux of the a.c. motor, the speed can be accurately estimated even in the a.c. motor that is liable to be magnetically saturated. A speed accuracy or a torque accuracy can be effectively improved.

Further, the speed deviation value inputted to the speed control unit is limited from the time during which the a.c. motor can be accelerated in the shortest time and the time during which the speed estimating unit can be accelerated in the shortest time. Accordingly, even when the a.c. motor is abruptly accelerated or decelerated, the speed can be effectively controlled in a stable way.

In the above-described embodiments, examples that the induction motor is employed as the a.c. motor are explained. However, any of the a.c. motors including a synchronous motor having a permanent magnet therein or other a.c. motors that can realize a vector control may be employed with the same effects.

The invention claimed is:

1. A vector control method for an a.c. motor without using a sensor,
the a.c. motor comprising:
a power converter for outputting electric power to the a.c. motor;
an exciting current command calculating unit for calculating an exciting current command from the magnetic saturation property of the a.c. motor to an arbitrary magnetic flux command;
a torque current command calculating unit for calculating a torque current command from an arbitrary torque command and the magnetic flux command;
a current detecting unit for detecting current supplied to the a.c. motor;
a coordinate transformation unit for transforming the detected current to a stator coordinate system;
a vector control and calculating unit for controlling and calculating a vector from the exciting current command, the torque current command, the coordinate transformed current detected value, a speed estimated value and a magnetic flux phase estimated value to output an output voltage command;
a switching pattern generating unit for generating a signal for PWM driving the power converter from the output voltage command; and
an all-dimensional magnetic flux speed observer for estimating the speed estimated value and the magnetic flux phase estimated value from the output voltage command and the coordinate transformed current detected value, wherein
a coefficient of a determinant used in the all-dimensional magnetic flux speed observer is corrected in accordance with the magnetic flux command.

2. The vector control method for an a. c. motor without using a sensor according to claim 1, wherein
the coefficient of the determinant is corrected on the basis of the change of the magnetic saturation property of the mutual inductance of the a.c motor.

3. The vector control method for an a.c. motor without using a sensor according to claim 1, wherein
the coefficient of the determinant used in the all-dimensional magnetic flux speed observer is corrected in accordance with a magnetic flux level calculated from the exciting current command.

4. A vector controller for an a.c. motor without using a sensor, comprising:
a power converter for outputting electric power to the a.c. motor;
an exciting current command calculating unit for calculating an exciting current command from the magnetic saturation property of the a.c. motor to an ordinary magnetic flux command;
a torque current command calculating unit for calculating a torque current command from an arbitrary torque command and the magnetic flux command;
a current detecting unit for detecting current supplied to the a.c. motor;
a coordinate transformation unit for transforming the detected current to a stator coordinate system;
a vector control and calculating unit for controlling and calculating a vector from the exciting current command, the torque current command, the coordinate transformed current detected value, a speed estimated value and a magnetic flux phase estimated value to output an output voltage command;
a switching pattern generating unit for generating a signal for PWM driving the power converter from the output voltage command; and
an all-dimensional magnetic flux speed observer for estimating the speed estimated value and the magnetic flux phase estimated value from the output voltage command and the coordinate transformed current detected value, wherein
a coefficient correcting unit is provided for correcting a coefficient of a determinant used in the all-dimensional magnetic flux speed observer in accordance with the magnetic flux command.

5. The vector controller for an a. c. motor without using a sensor according to claim 4, wherein
the coefficient correcting unit corrects the coefficient on the basis of the change of the magnetic saturation property of the mutual inductance of the a.c motor.

6. The vector controller for an a.c. motor without using a sensor according to claim 4, further comprising:
a magnetic flux model calculating unit for calculating a magnetic flux level from the exciting current command; and
a coefficient correcting unit for correcting the coefficient of the determinant used in the all-dimensional magnetic flux speed observer in accordance with the magnetic flux level.

7. A vector control method for an a.c. motor without using a sensor, the a.c. motor including:
a power converter for outputting electric power to the a.c. motor;
a current detecting unit for detecting current supplied to the a.c. motor;
a coordinate transformation unit for transforming the detected current to a stator coordinate system;
a speed control unit for outputting a torque current command so that an arbitrary speed command corresponds to the speed estimated value of the a.c. motor;
a vector control and calculating unit for controlling and calculating a vector from an arbitrary exciting current command, the torque current command, the coordinate transformed current detected value, the speed estimated value and a magnetic flux phase estimated value to output an output voltage command;
a switching pattern generating unit for generating a signal for PWM driving the power converter from the output voltage command; and
a speed estimating unit for estimating the speed estimated value and the magnetic flux phase estimated value from the output voltage command and the coordinate transformed current detected value, wherein
when a speed deviation as a deviation between the arbitrary speed command as an input of the speed control unit and the speed estimated value is inputted to the speed control unit, the speed deviation is limited not to generate an acceleration not lower than the ability of the speed estimating unit and inputted to the speed control unit.

8. The vector control method for an a. c. motor without using a sensor according to claim 7, wherein the speed estimating unit is an all-dimensional magnetic flux speed observer including an all-dimensional observer and a speed estimator.

9. A vector controller for an a. c. motor without using a sensor, comprising:

a power converter for outputting electric power to the a.c. motor;

a current detecting unit for detecting current supplied to the a.c. motor;

a coordinate transformation unit for transforming the detected current to a stator coordinate system;

a speed control unit for outputting a torque current command so that an arbitrary speed command corresponds to the speed estimated value of the a.c. motor;

a vector control and calculating unit for controlling and calculating a vector from an arbitrary exciting current command, the torque current command, the coordinate transformed current detected value, the speed estimated value and a magnetic flux phase estimated value to output an output voltage command;

a switching pattern generating unit for generating a signal for PWM driving the power converter from the output voltage command; and a speed estimating unit for estimating the speed estimated value and the magnetic flux phase estimated value from the output voltage command and the coordinate transformed current detected value, wherein a speed deviation limiting unit is provided for limiting a speed deviation not to generate an acceleration not lower than the speed estimating capability of an all-dimensional magnetic flux speed observer when the speed deviation as a deviation between the arbitrary speed command as an input of the speed control unit and the speed estimated value is inputted to the speed control unit, and inputting the limited speed deviation to the speed control unit.

10. The vector controller for an a. c. motor without using a sensor according to claim 9, wherein the speed estimating unit is an all-dimensional magnetic flux speed observer including an all-dimensional observer and a speed estimator.

\* \* \* \* \*